US011855526B2

(12) United States Patent
Johnson et al.

(10) Patent No.: US 11,855,526 B2
(45) Date of Patent: Dec. 26, 2023

(54) HALF-BRIDGE WITH VARIABLE DEAD BAND CONTROL AND ZERO-VOLTAGE SWITCHING

(71) Applicant: HELLA GmbH & Co. KGaA, Lippstadt (DE)

(72) Inventors: Philip Michael Johnson, Brighton, MI (US); Alan Wayne Brown, Canton, MI (US)

(73) Assignee: HELLA GmbH & Co. KGaA, Lippstadt (DE)

( * ) Notice: Subject to any disclaimer, the term of this patent is extended or adjusted under 35 U.S.C. 154(b) by 179 days.

(21) Appl. No.: 17/287,422

(22) PCT Filed: Oct. 23, 2019

(86) PCT No.: PCT/IB2019/059082
§ 371 (c)(1),
(2) Date: Apr. 21, 2021

(87) PCT Pub. No.: WO2020/084532
PCT Pub. Date: Apr. 30, 2020

(65) Prior Publication Data
US 2021/0391784 A1 Dec. 16, 2021

Related U.S. Application Data

(60) Provisional application No. 62/750,896, filed on Oct. 26, 2018.

(51) Int. Cl.
*H02M 1/38* (2007.01)
*H02M 1/00* (2006.01)
*H02M 3/335* (2006.01)

(52) U.S. Cl.
CPC ........... *H02M 1/38* (2013.01); *H02M 1/0058* (2021.05); *H02M 3/33571* (2021.05)

(58) Field of Classification Search
CPC .... H02M 1/03; H02M 1/0054; H02M 1/0058; H02M 7/48; H02M 7/53; H02M 7/537;
(Continued)

(56) References Cited

U.S. PATENT DOCUMENTS 7,456,620 B2 * 11/2008 Maksimovic ....... H02M 3/1588
                                                    323/283
7,825,642 B1 * 11/2010 Young .................... H02M 3/156
                                                    323/283
(Continued)

OTHER PUBLICATIONS

Jani Hiltunen et al., Variable-Frequency Phase Shift Modulation of a Dual Active Bridge Converter, Jan. 12, 2015, IEEE Transactions on Power Electronics (vol. 30, Issue: 12, Dec. 2015), DOI: 10.1109/TPEL.2015.2390913 (Year: 2015).*
(Continued)

*Primary Examiner* — Gustavo A Rosario-Benitez
(74) *Attorney, Agent, or Firm* — WARNER NORCROSS + JUDD LLP (57) ABSTRACT

An improved method for zero-voltage switching (ZVS) of a voltage-fed half-bridge using a variable dead band is provided. The duration of the dead band is determined dynamically and is precisely long enough to ensure the absence of shoot-through events while also minimizing or eliminating switching losses and reverse conduction losses. The method generally includes: (a) calculating the equivalent capacitance as seen by the current source charging the midpoint of the half-bridge; (b) calculating the ZVS charge requirement based on the link voltage and the equivalent capacitance; (c) calculating the charge delivered by the current source over time during a dead band vector, equating the result to the ZVS charge requirement, and solving for the ZVS time requirement at each commutation point over the switching
(Continued)

cycle; and (d) updating the dead bands for each commutation of each half-bridge in the switched-mode power converter.

14 Claims, 9 Drawing Sheets

(58) Field of Classification Search
CPC ... H02M 7/5387; H02M 7/53871; H02M 1/38
See application file for complete search history.

(56) References Cited

U.S. PATENT DOCUMENTS

| | | | | |
|---|---|---|---|---|
| 2002/0001210 A1* | 1/2002 | Kuranuki | ............ | H02M 3/3376 363/98 |
| 2003/0112910 A1* | 6/2003 | Yoh | ............ | G06F 1/10 375/356 |
| 2007/0258271 A1* | 11/2007 | Meszlenyi | ............ | H02M 3/01 363/16 |
| 2008/0123374 A1* | 5/2008 | Vinciarelli | ............ | H02M 7/10 363/65 |
| 2008/0278984 A1 | 11/2008 | Stanley | | |
| 2015/0103566 A1* | 4/2015 | Keogh | ............ | H02M 3/33507 363/21.12 |
| 2019/0372461 A1* | 12/2019 | Wang | ............ | H02M 1/083 |
| 2021/0211055 A1* | 7/2021 | Harshey | ............ | H02M 1/0058 |

OTHER PUBLICATIONS

Gupta V. et al., "Phase-Staggered Multiple ZVS Inverters For Grid-Connected PV Systems", IEEE, Energy Conversion Congress and Exposition, Sep. 15, 2013, pp. 4503-4510.
International Search Report and Written Opinion of PCT/IB2019/059082 dated Jan. 31, 2020, total of 11 pages.
Tayebi et al., "Effects of Circuit Nonlinearities on Dynamic Dead Time Optimization for a Three-Phase Microinverter", EEE Applied Power Electronics Conference and Exposition (APEC), Tampa, FL, USA, 2017, pp. 1462-1466.
Marxgut et al., "Ultraflat Interleaved Triangular Current Mode (TCM) Single-Phase PFC Rectifier", IEEE Transactions on Power Electronics vol. 29, No. 2, pp. 873-882 (2014).
Marxgut et al., "Interleaved Triangular Current Mode (TCM) Resonant Transition, Single Phase PFC Rectifier with High Efficiency and High Power Density", IEEE International Power Electronics Conference (2010).
Li et al., "An Adaptive Dead-time Control Scheme for High-Switching-Frequency Dual-Active-Bridge Converter", Twenty-Seventh Annual IEEE Applied Power Electronics Conference and Exposition (APEC), Orlando, FL, 2012, pp. 1355-1361.

* cited by examiner

HALF-BRIDGE WITH VARIABLE DEAD BAND CONTROL AND ZERO-VOLTAGE SWITCHING

CROSS-REFERENCE TO RELATED APPLICATION

This application claims the benefit of U.S. Provisional Application 62/750,896, filed Oct. 26, 2018, the disclosure of which is incorporated by reference in its entirety.

FIELD OF THE INVENTION

The present invention relates to zero-voltage-switching of a half-bridge converter for on-board chargers and other applications.

BACKGROUND OF THE INVENTION

Figure 1:
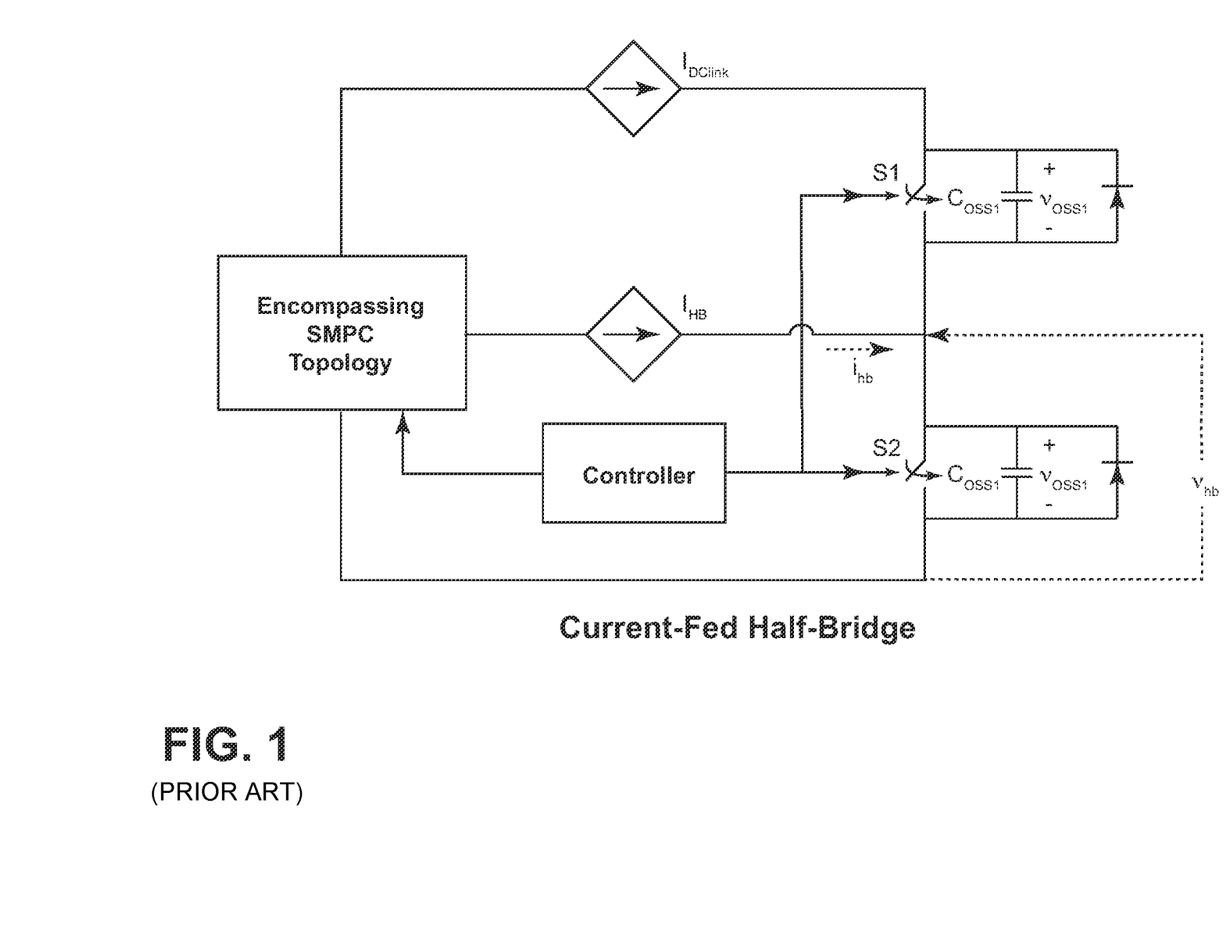
FIG. 1 is a circuit diagram of a current-fed half-bridge converter.
Figure 2:
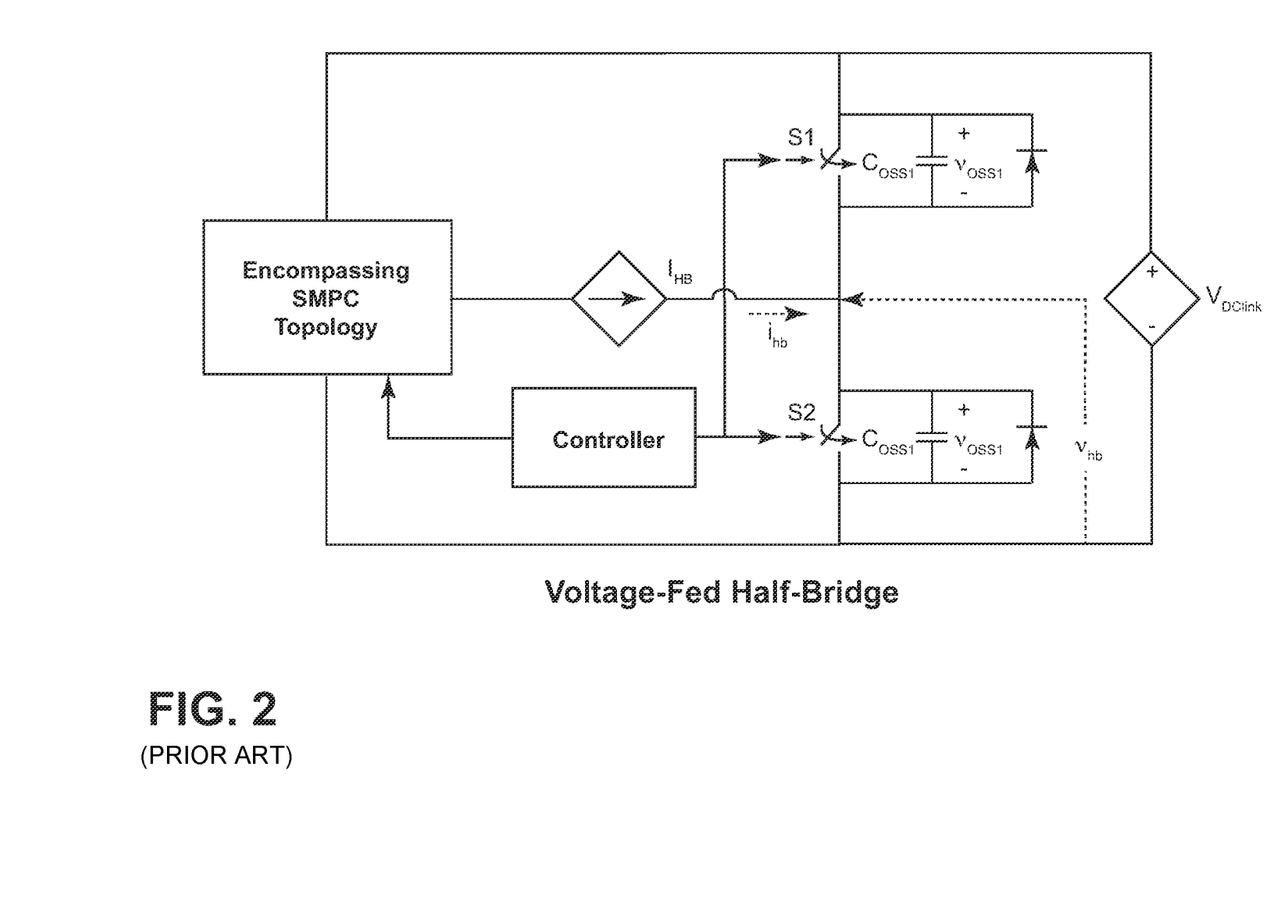
FIG. 2 is a circuit diagram of a voltage-fed half-bridge converter.

A half-bridge is a component of many Switch Mode Power Converter (SMPC) topologies. An isolated Dual-Active-Bridge (DAB), for example, is an SMPC that uses four half-bridges and a transformer to deliver power from the primary to the secondary of the transformer. The DAB has one full-bridge (two half-bridges in parallel) driving the primary winding and one full-bridge driving the secondary winding. A current-fed half-bridge, shown in FIG. 1, includes two semiconductor switches in series with a current source or storage element, like an inductor, with a connection to the midpoint node. The nodes at the end of the series combination are referred to as a linkage. In the case of a voltage-fed half-bridge, shown in FIG. 2, the linkage is referred to as a DC linkage, since its value must not go negative. Voltage-fed half-bridges may come in any combination of controlled or un-controlled switches. Examples include fully-controlled half-bridges (e.g., a bi-directional buck-boost DC/DC converter), half-controlled half-bridges (e.g., simple buck DC/DC converter), and uncontrolled half-bridges (e.g., the front end rectifier of Totem-Pole PFC topologies).

Treating the half-bridge as one type of switching block, the current-fed half-bridge (CFHB) and the voltage-fed half-bridge (VFHB) can be used to construct a SMPC. Switching blocks are active power components and are placed in a configuration with passive power components to create the SMPC power path. The voltage-fed half-bridge can additionally be controlled, half-controlled, or uncontrolled. Many or most controlled semiconductor switches used in SPMCs are only controlled when current is flowing through its primary conduction path in one direction and will self-activate (become reverse biased) when current flows in the opposite direction. Two such switches in a half-bridge configuration are considered a controlled switching block despite having uncontrolled states.

Given a positive emf across the linkage, each of four block states can be commanded by a controller. More particularly, each switch has two states: conducting and non-conducting (blocking). Possible control vectors (drive signals) include the following:

| S1 | S2 | Control Vector |
|----|----|----|
| On | Off | High-Side Vector |
| Off | On | Low-Side Vector |
| Off | Off | Dead-Band Vector |
| On | On | Shoot-Through Vector |

The high-side control vector applies the positive rail of the linkage, $V_{link}$, to the midpoint, defining the voltage across S1 at $v_{oss1}$=~0V and across S2 at $v_{oss2}$=$V_{link}$. The low-side control vector applies the negative rail of the linkage to the midpoint, defining the voltage across S1 at $v_{oss1}$=$V_{link}$ and across S2 at $v_{oss2}$=~0V. The dead-band control vector releases control of the half-bridge midpoint to the control of the greater topology, which moves $v_{hb}$ according to the controlled current source, such that $v_{oss1}$+$v_{oss2}$=$V_{link}$. The shoot-through control vector shorts both positive and negative rails of the linkage to $v_{hb}$, such that $v_{oss1}$=$v_{oss2}$=~0V.

In a CFHB, the current source is in series with both switches S1 and S2, and thereby regulates their current, even when both switches are conducting. Therefore, all four control vectors can be used during normal operation for a CFHB. In a VFHB, however, a voltage source is in series with switches S1 and S2, and consequently a shoot-through control vector will short the voltage source, resulting in an unregulated current. This condition is potentially catastrophic. To protect against this condition, the beginning of a turn-on signal for one switch is delayed with respect to the end of a turn-off signal for the other switch by a dead band (or dead time). This technique ensures one switch is fully off (non-conducting) before the complementary switch is driven on, thereby avoiding unintended shoot-through events. However, the duration of the dead band is typically predetermined and fixed in length. As a result, existing half-bridge converters experience thermal losses attributed to a dead band longer than strictly required in order to ensure the absence of shoot-through events.

SUMMARY OF THE INVENTION

An improved method for zero-voltage switching (ZVS) of a voltage-fed half-bridge (VFHB) using a variable dead band is provided. The duration of the dead band is determined dynamically by a processor according to a real-time, open loop circuit model and is precisely long enough to ensure the absence of shoot-through events while also minimizing or eliminating switching losses and reverse conduction losses. Eliminating reverse conduction losses according to the present method improves the efficiency of the SMPC, reduces thermal stresses on the semiconductor devices, and allows for more easily designed cooling solutions. Any SMPC using a VFHB can be modeled as a controlled current source feeding the half-bridge midpoint and controlled voltage source feeding the half-bridge rails.

In accordance with one embodiment, the method generally includes: (a) calculating the equivalent capacitance as seen by the current source charging the midpoint of the half-bridge; (b) calculating the ZVS charge requirement based on the link voltage and the equivalent capacitance; (c) calculating the charge delivered by the current source over time during a dead band vector, equating the result to the ZVS charge requirement, and solving for the ZVS time requirement at each commutation point over the switching cycle; and (d) updating the dead bands for each commutation of each half-bridge in the SMPC. The above method is performed primarily in software in conjunction with a micro-processor and control circuit hardware adapted to accommodate real-time updating of the dead band for the SMPC.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENT

An improved method for zero-voltage switching of a voltage-fed half-bridge using a variable dead band is provided. As discussed herein, the duration of the dead band is determined dynamically to ensure the absence of shoot-through events while also minimizing or eliminating switching losses and reverse conduction losses. As background, Part I below includes known techniques for zero-voltage switching of a voltage-fed half-bridge. Part II below includes a discussion of the method of the present invention, namely the zero-voltage switching of a voltage-fed half-bridge using a dynamically calculated variable dead band control vector.

I. Zero-Voltage Switching of Voltage-Fed Half-Bridge

Zero Voltage Switching (ZVS) is the commutation of a semiconductor switch from an off state to an on state while there is zero voltage across its primary conduction path. The process by which a ZVS commutation takes place can be illustrated with the low-to-high commutation of an arbitrary VFHB, as shown in FIGS. 3(a)-3(f). With respect to ZVS, a semiconductor switch may be considered as an ideal MOSFET in parallel with an output capacitance and an anti-parallel diode with forward voltage $V_{rth}$. Using two such switches in a half-bridge configuration, such that S1 is the high-side switch and S2 is the low-side switch, across an arbitrary DC linkage, $V_{link}$, referenced to the low-side rail, here referred to as GND, with the midpoint voltage, $V_{HB}$, supplied by some controlled current source (a resonant inductor for example) such that current flowing into the midpoint, $i_{hb}$, is always positive, the entire commutation process, under ZVS conditions, can be broken down as shown for the low-to-high half-bridge commutation shown in FIGS. 3(a)-3(f). Here, the output capacitance of each switch is abbreviated as $C1=C_{oss1}$ and $C2=C_{oss2}$. The anti-parallel diode is considered to be ideal and the voltage source $V_{rth}$(D) is a function of the diode's state—conducting=1 and non-conducting=0 such that $V_{rth}(0)=0V$ and $V_{rth}(1)=V_{rth}$. In this way, the behavior of any arbitrary self-activating semiconductor switch can be modeled as the anti-parallel device.

Figure 3:
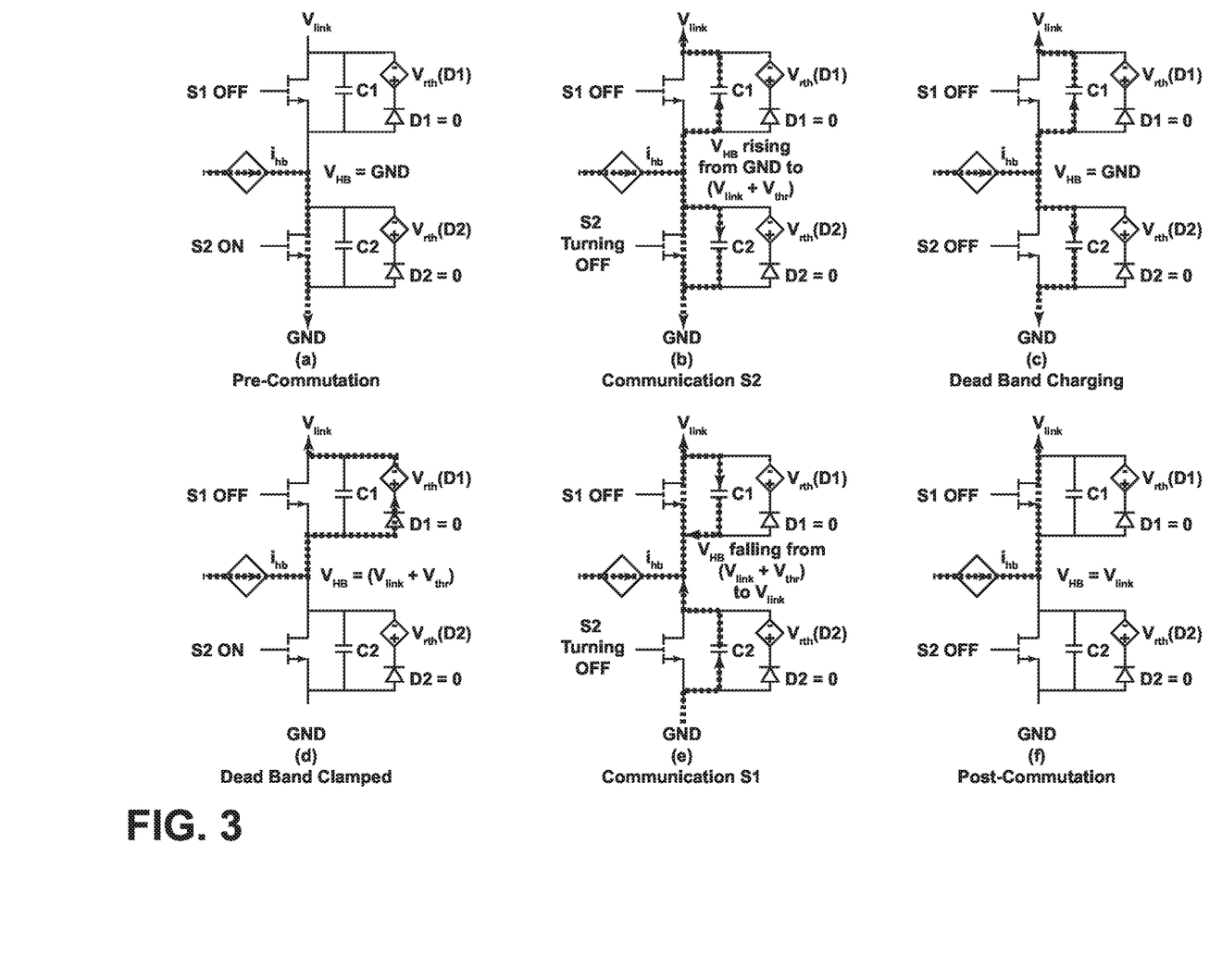
FIGS. 3(a) to 3(f) illustrate low-to-high commutation states of a VFHB under standard ZVS conditions with a fixed dead band.

Prior to commutation in FIG. 3(a), $i_{hb}$ flows freely through S2 and $V_{HB}$ is clamped to GND. When S2 turns off, $i_{hb}$ begins to migrate from the conduction channel to charging the C', of both S2 and S1, as shown in FIG. 3(b). This marks the beginning of the dead band, as the controller is applying a dead band control vector, driving both S1 and S2 off simultaneously. The rate at which $V_{HB}$ rises while the channel is collapsing is controlled by $i_{hb}$, the channel resistance of S1, and the $C_{oss}$ of both S1 and S2—as the channel collapses, the resistance increases, and more of $i_{hb}$ migrates to charging C1 and C2. Once the switch is fully off, the channel resistance is high enough that the current through it becomes negligible and the change in $V_{HB}$ is then be dominated by the following relationship (equation 1):

$$i_{hb}(t) = (C1 + C2)\frac{dV_{HB}}{dt} \tag{1}$$

If the switch has a fast turn-off edge rate, as in a MOSFET, the channel stops conducting well before the $C_{oss}$ charges to the opposite linkage rail, so the dead band must be long enough to charge the midpoint from GND to $V_{link}$, and thereby discharge C1 from $V_{link}$ to 0V. Ideally, S1 would turn on at exactly $V_{HB}=V_{link}$, but in reality $V_{HB}$ will continue charging until D1 of S1 becomes reversed biased and clamps $V_{HB}$ to $V_{link}+V_{rth}$. Once the midpoint voltage is clamped, S1 is burning energy for the remainder of the dead band. Thus, it is desired to make this region as short as possible. When S1 commutates on, some switching loss will be experienced due to C1 being charged to $-V_{rth}$ and discharging through the forming channel, but this loss will be small. Post S1's commutation, $i_{hb}$ should still be positive into the bridge, though, ideally, $i_{hb}$ would reach 0 A immediately after S1's commutation to minimize the resonant current.

Typically, the dead band is set in the control circuit generating the Pulse Width Modulation (PWM) for the half-bridge to a fixed value. The ZVS Time Requirement $T_{ZVS}$ is the minimum time required for controlling a current source (assuming a known current) to deliver the charge needed for ZVS. The ZVS Time Requirement $T_{ZVS}$ is inversely proportional to the current during the dead band and directly proportional to the link voltage. Therefore, a typical control circuit for a ZVS application will fix the dead band according to the lowest expected $I(T_{ZVS})$ and the highest link voltage so that ZVS can be ensured for all operating points. However, this means that when the current flowing into the half-bridge is larger, the ZVS charge requirement will be met faster, and the midpoint voltage, $v_{hb}$, of the half-bridge defined by S1 and S2 will reach the targeted linkage rail before the end of the dead band and continue charging beyond the rail.

Figure 4:
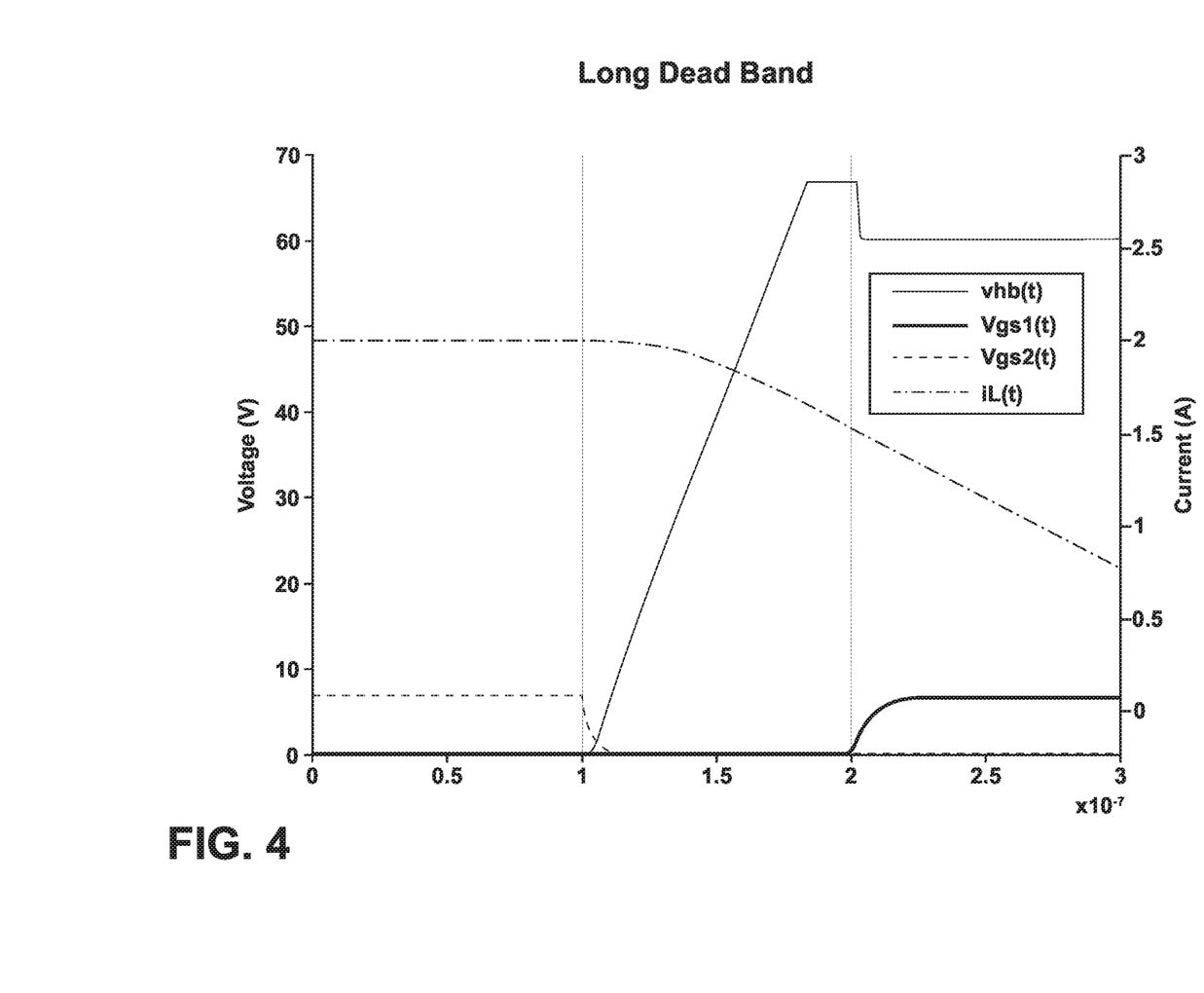
FIG. 4 illustrates a long dead band for control of a VFHB, in which the dead band is longer than the time required to charge the half-bridge capacitance.
Figure 5:
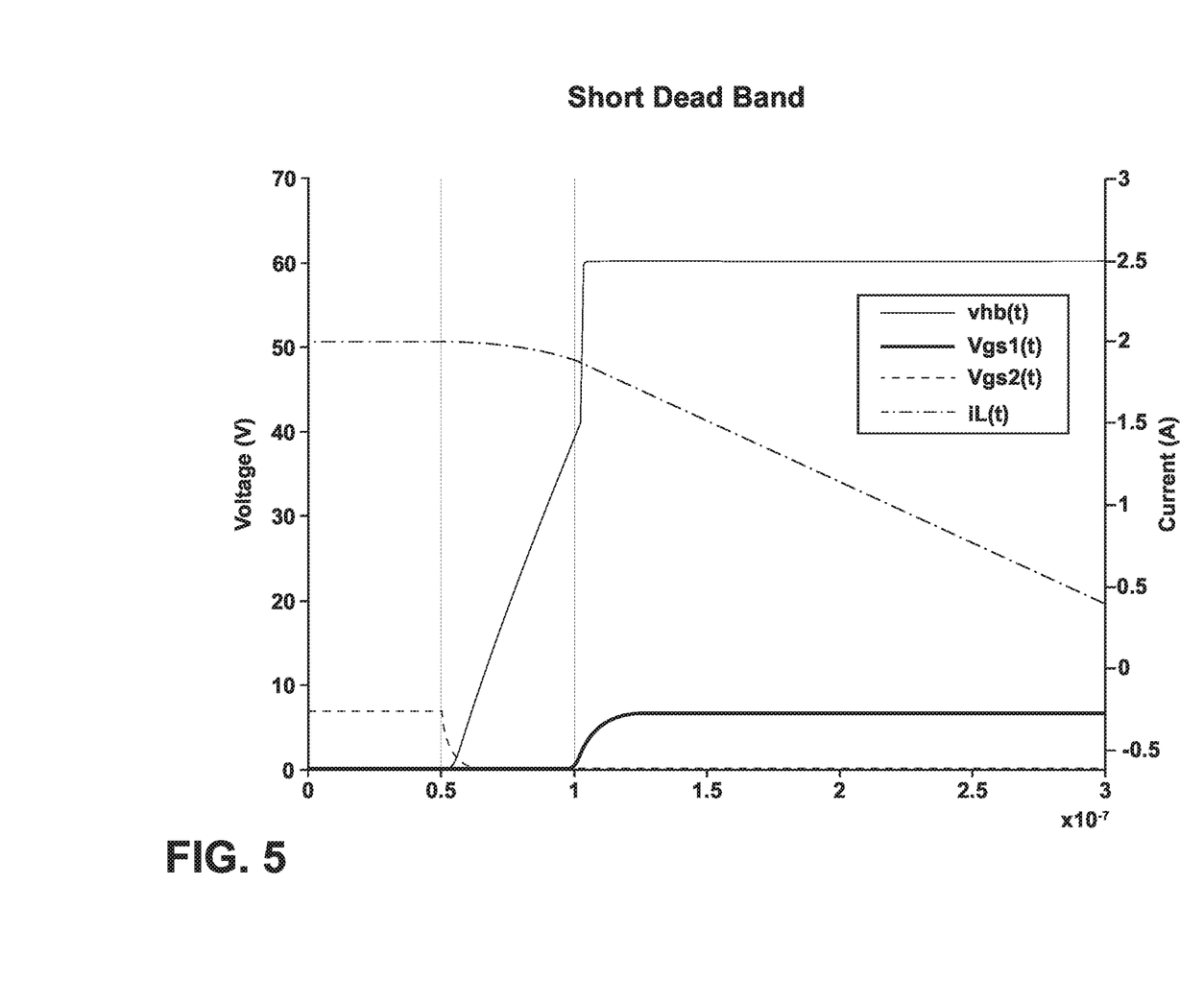
FIG. 5 illustrates a short dead band for control of a VFHB, in which the dead band is shorter than the time required to charge the half-bridge capacitance.
Figure 6:
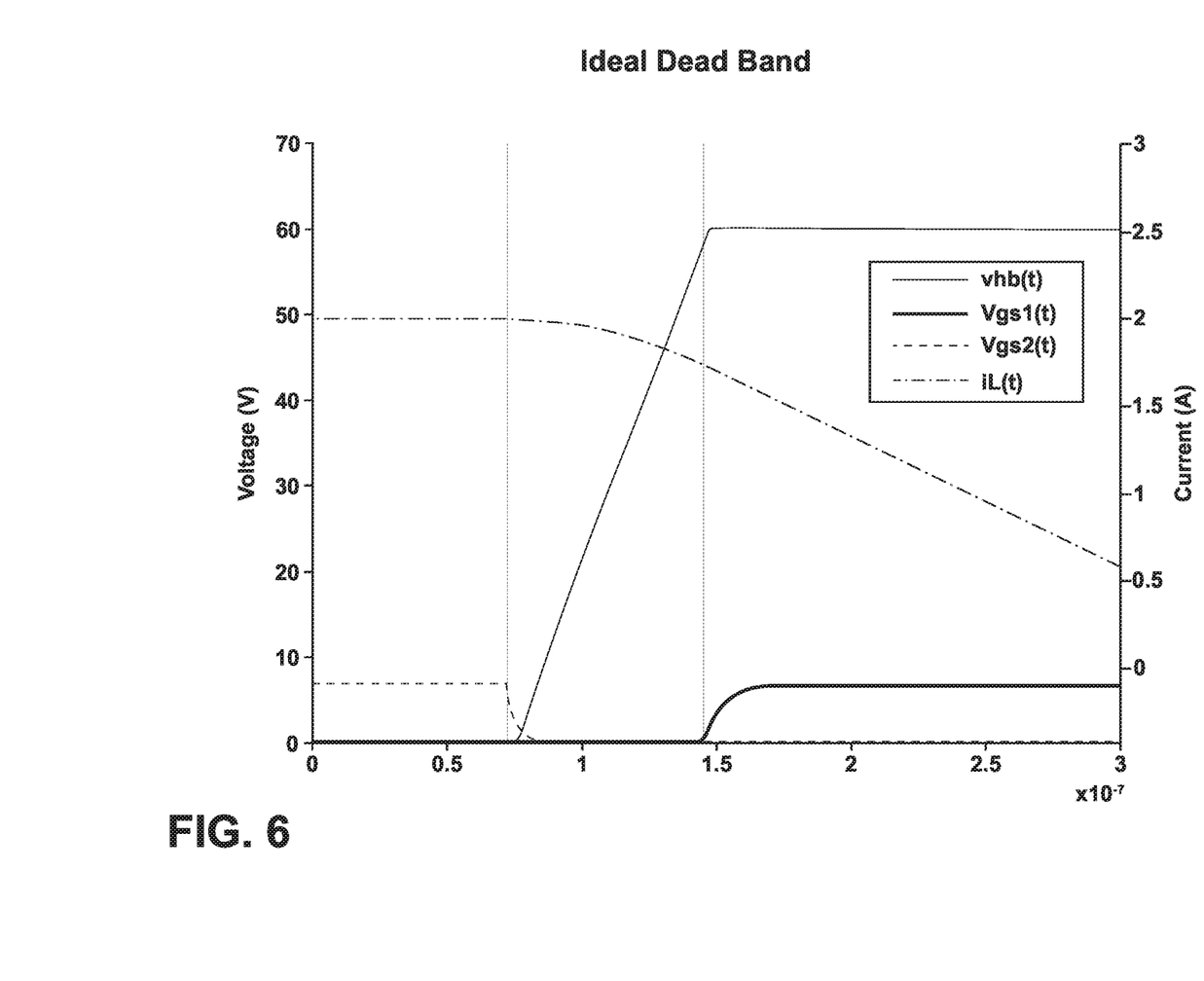
FIG. 6 illustrates a long dead band for control of a VFHB, in which the dead band is precisely long enough to charge the half-bridge capacitance of a half-bridge for ZVS.

If this charging is allowed to continue, not only will ZVS be lost, but, under high switching currents, the voltage rating of the semiconductor switch may be exceeded leading to life degradation and device failure. For this reason, ZVS topologies (and most SPMC topologies in general) provide a free-wheeling path to the midpoint current, $i_{hb}$. This is accomplished by the antiparallel body or external diodes of MOSFETs and IGBTs or the reverse conduction properties of the 2 DEG in HEMTs, for example. Because this reverse conduction is uncontrolled, there must be an associated voltage drop equal to threshold of the antiparallel device, and the midpoint will therefore be clamped to the linkage rail plus the reverse threshold voltage, $V_{rth}$. In this clamped conduction state, $i_{hb}$ is being forced through the device in the direction of the reverse voltage drop, generating thermal losses referred to as reverse conduction losses. This condition is depicted in FIG. 3(d), in which the low-to-high commutation of the half bridge is significantly longer than the time required to deliver enough charge to the equivalent capacitance to change the midpoint voltage by the required amount. As a result, once the midpoint voltage reaches $V_{link}$ (60V in the present example), the current keeps charging the equivalent capacitance until the midpoint voltage exceeds the high-side rail voltage by the reverse threshold of the device. FIG. 4 (depicting a short dead band) results in hard switching at about 20V in this example, while the ideal dead band of FIG. 5 avoids switching losses and reverse conduction losses. FIGS. 4, 5, and 6 provide an example based on the general case presented in FIGS. 3(a)-(f) where the current source is provided with an 8 μH inductor with constant initial current of 2 A and a link voltage of 60V. The only parameter varied between the three figures is the dead time $t_{db}$.

II. Variable Dead Band Control for Voltage Switching of Voltage-Fed Half-Bridge

In order to eliminate the reverse conduction losses discussed in Part I above, the dead band is calculated dynamically for each commutation point instead of using a predetermined value corresponding to a worse-case requirement. Eliminating reverse conduction losses improves the efficiency of the SMPC, reduces thermal stresses on the semiconductor devices, and allows for a more easily designed cooling solution.

Figure 7:
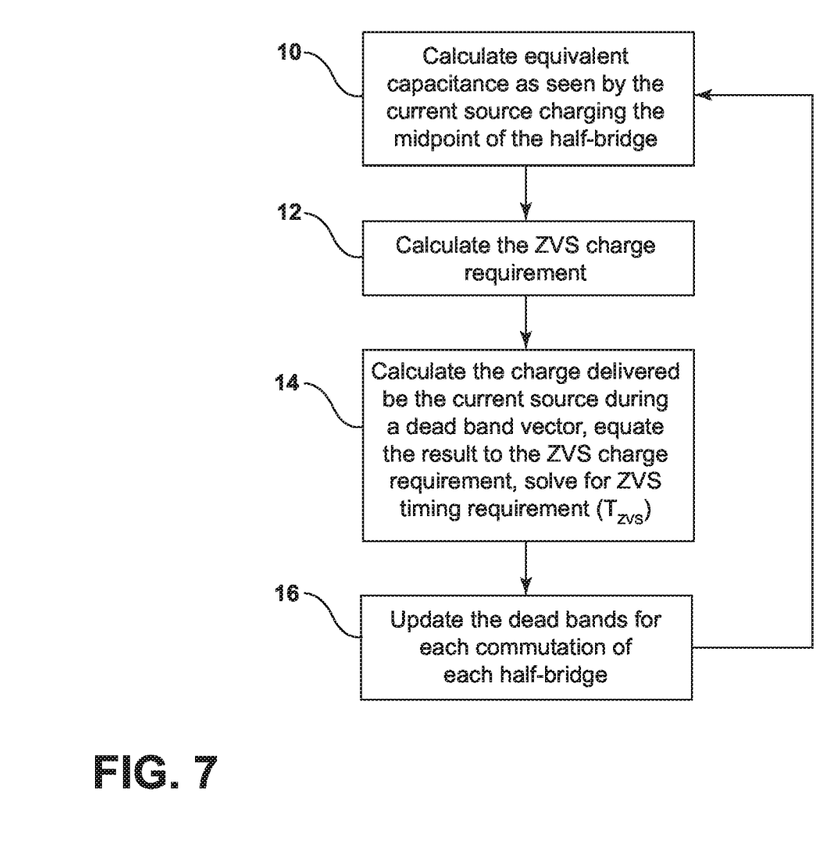
FIG. 7 is a flow-diagram of a method for ZVS of a voltage-fed half-bridge in accordance with one embodiment.

Referring to the flow-chart of FIG. 7, a method for zero-voltage switching of a voltage-fed half-bridge using a variable dead band control vector is illustrated. The method generally includes calculating the dead band dynamically for each commutation point instead of using a predetermined value corresponding to a worst-case requirement. More particularly, the method generally includes the following method steps: (a) calculating the equivalent capacitance $C_{eq}$ as seen by the current source charging the midpoint of the half-bridge based on the link voltage, the SMPC topology, and the SMPC circuit state (step 10); (b) calculating the ZVS charge requirement based on the link voltage and the equivalent capacitance (step 12); (c) calculating the charge delivered by the current source over time during a dead band vector, $Q_{hb}$, equating the result to the ZVS charge requirement, and solving for $T_{ZVS}$ at each commutation point over the switching cycle (step 14); and (d) updating the dead bands for each commutation of each half-bridge in the SMPC (step 16).

Figure 8:
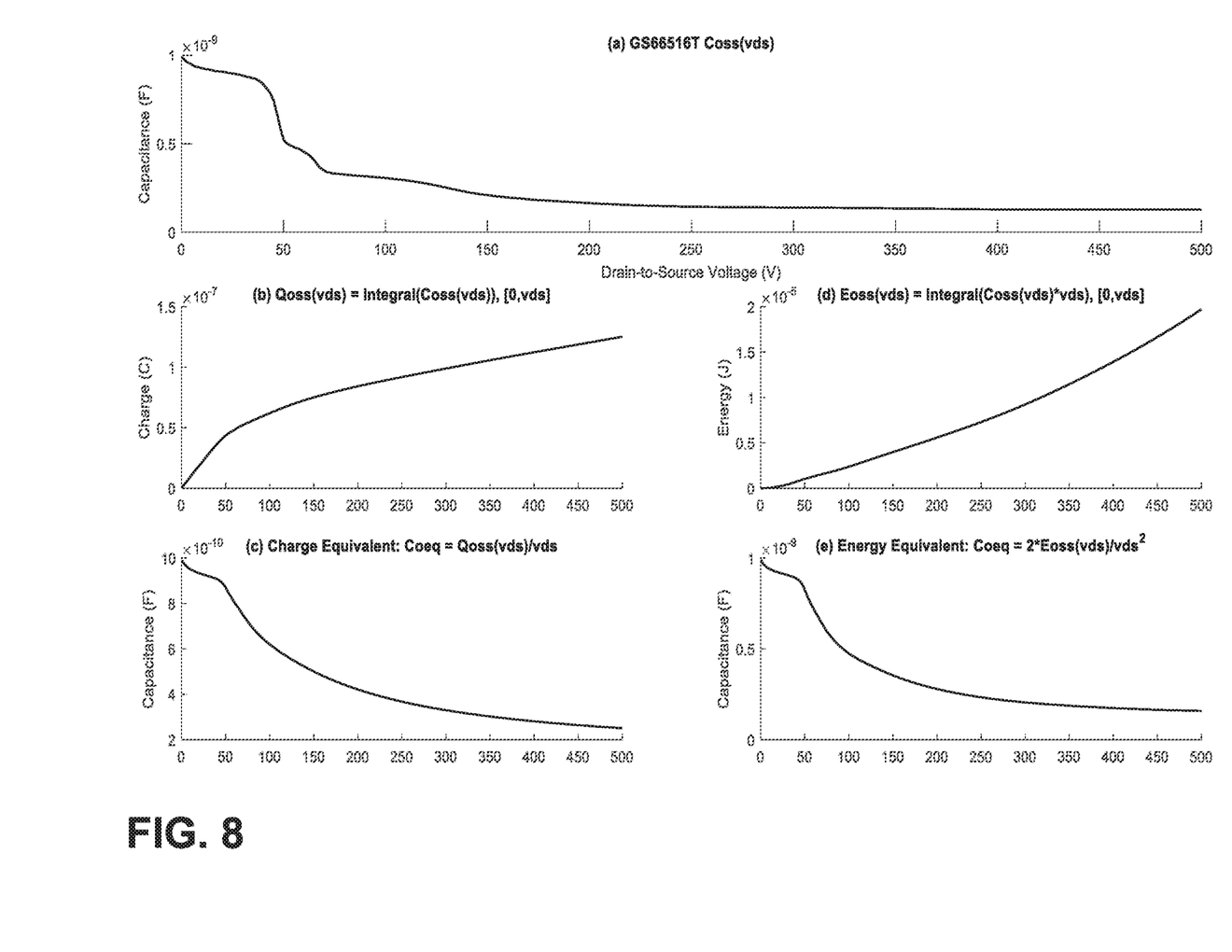
FIGS. 8(a) to 8(e) illustrate the change in Charge Equivalent Capacitance with corresponding charge accumulated and equivalent static capacitance.

Calculating the equivalent capacitance $C_{eq}$ at step 10 includes determining any capacitances along the return path of the current source. This can include parasitic PCB capacitances, winding capacitances of magnetics, and intended capacitances (such as resonant tanks). The examples used in FIGS. 4, 5 and 6 assume only the switch capacitance, $C_{oeq}$, PCB capacitance, $C_{PCB}$, and winding capacitance, $C_L$, are in parallel along the return path of the inductor. Thus, $C_{eq}=C_{oeq}+C_{PCB}+C_L$. This is the case in a single half-bridge commutation in a DAB. This step is also visualized with the following example. Using a Gallium Nitride High Electron Mobility Transistor (GaN HEMT) from GaN Systems Inc., part number GS66516T, FIG. 8 demonstrates how capacitance, charge, equivalent capacitance, and energy can change over output voltage of a single GaN HEMT. Since the change in output voltage over the dead band of a half-bridge commutation must equal the linkage, vds (drain-to-source voltage) in FIG. 8 is interchangeable with $V_{link}$ FIG. 3(a). FIG. 8(a) shows the output capacitance change over voltage. FIG. 8(b) shows the accumulated charge across one device over voltage. FIG. 8(c) plots the equivalent static capacitance value that would hold the same amount of charge at that voltage as the $C_{oss}$, called the "charge equivalent capacitance". FIG. 8(d) shows the accumulated energy over voltage. FIG. 8(e) shows the equivalent static capacitance value that would hold the same amount of energy at that voltage as the $C_{oss}$, called the "Energy Equivalent Capacitance."

Based on the equivalent capacitance $C_{eq}$, the ZVS charging requirement, $Q_{ZVS}$, is then calculated according to the following (equation 2), wherein $C_{eq}$ is a function of voltage because the $C_{oss}$ of a semiconductor is usually not constant over output voltage, $v_{oss}$:

$$Q_{ZVS} = \int_0^{V_{link}} C_{eq}(v)dv \qquad (2)$$

As noted above, $Q_{ZVS}$ is the charge required to move the midpoint voltage of S1 and S2, $v_{hb}=v_{oss2}$, from ~0V to $V_{link}$, which, in turn, discharges $v_{oss1}$ from $V_{link}$ to ~0V. Calculating the ZVS timing requirement, $T_{ZVS}$, is then performed according to the following (equation 3-4):

$$I(T_{ZVS}) = \frac{1}{T_{ZVS}} \int_0^{T_{ZVS}} i(t)dt = \frac{Q_{ZVS}}{T_{ZVS}} \qquad (3)$$

$$T_{ZVS} = \frac{Q_{ZVS}}{I(T_{ZVS})} \qquad (4)$$

In the above equations 3, $Q_{ZVS}$ is calculated as the average current during a dead band vector (the inverse ZVS period multiplied by the integral of the current). In the above equation 4, $T_{ZVS}$ is solved for as the required charge for ZVS divided by the average current over the time allowed for ZVS, or $I(T_{ZVS})$. Accordingly, to properly set the initial conditions for determining $T_{ZVS}$, the initial current at the start of each dead band during a switching cycle must be calculated.

As one example, the controlled current source in FIG. 3(a) is realized with a load comprising a resonant inductor, L=8 μH. Assume that at time $t_0=0$ s, L is charged to $i_L=2$ A with no initial driving voltage across it's terminals, $V_0=0V$, meaning current is initially freewheeling through the inductor. The winding capacitance of the inductor is $C_L=50$ pF and the parasitic capacitance of the PCB is $C_{PCB}=600$ pF, which are in parallel with the $C_{oss}$ of both S1 and S2, as seen by the inductor. The link voltage is set to $V_{link}$=60V and the dead band, given by $T_{db0}$, varied to show its effect. FIG. 6 shows a low-to-high commutation of the half-bridge where the dead band, $t_{db}$=72.3 ns from t=72.3 ns to t=144.6 ns, is the precise time required for 2 A to deliver enough charge to the equivalent capacitance to change the midpoint voltage by 60V. This is the ideal commutation of the half-bridge. The dead band could be larger than optimal by the time required to charge an additional 6.8V, providing a buffer region for real-world sensor errors without incurring reverse conduction losses.

The method further includes updating the dead bands for each commutation of each half-bridge in the SMPC at step 16. Each step of the foregoing method can be implemented in digital logic in connection with a dual-active-bridge (DAB) converter having four half-bridges, but the present method can be implemented in other SMPCs as desired. The method does not require any additional hardware, and instead relies on a mathematical model of the system topology to calculate the dead band in real time. As noted above, eliminating reverse conduction losses according to the present method improves the efficiency of the SMPC, reduces thermal stresses on the semiconductor devices, and allows for more easily designed cooling solutions.

Figure 9:
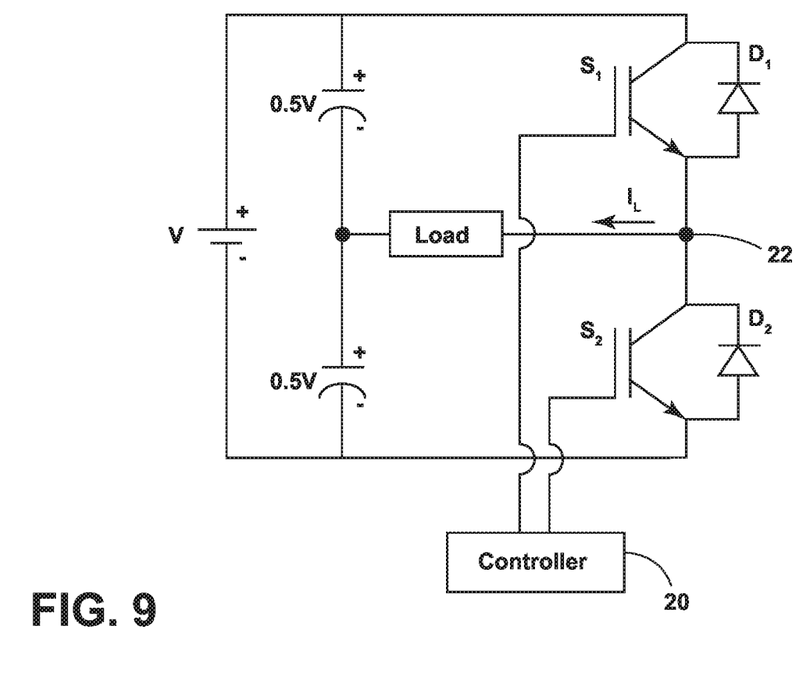
FIG. 9 is a circuit diagram of a single-phase voltage-fed inverter with an ideal dead band determined by a controller in accordance with a current embodiment.

In accordance with a further embodiment, a single-phase voltage-fed inverter for producing a square wave output is shown in FIG. 9. The inverter includes a half-bridge having two series-connected switches S1, S2 and two freewheeling anti-parallel diodes D1, D2. The switches may not be activated simultaneously, which would otherwise short the voltage source. In accordance with one embodiment, the ideal dead band is calculated in digital logic, the dead band being the interval between the turn-off and turn-on of the series connected switches. In particular, a controller 20, for example an integrated circuit or a digital signal processor, determines the equivalent capacitance at a mid-point 22 of the half-bridge. The equivalent capacitance can be determined empirically for a given input current at the mid-point or a given rail voltage across the half-bridge, and generally includes any switch capacitance, PCB capacitance, and winding capacitance. Based on this equivalent capacitance, the controller 20 determines the ZVS charging requirement ($Q_{ZVS}$) according to equation (2) above, which represents the charge required to move the midpoint voltage from 0V to the rail voltage ($V_{link}$) The controller 20 then determines the ideal dead band $T_{ZVS}$ according to equation (4) above, in which the ZVS charging requirement ($Q_{ZVS}$) is divided by the average current over time allowed for ZVS ($I(T_{ZVS})$), which is obtained by the controller from the initial current at the beginning of each dead band. The controller 20 then stores the ideal dead band $T_{ZVS}$ to computer readable memory, potentially updating the existing value for the half-bridge dead band, and creates an interval between the turn-off and turn-on of the series connected switches at least equal to the ideal dead band $T_{ZVS}$ (e.g., with or without a buffer period). This process can be repeated periodically or in response to an event, for example in response to a change in the input current to the mid-point 22 of the half-bridge, or in response to a change to the DC rail voltage.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A method comprising:
providing a switch mode power converter including a voltage source outputting a DC rail voltage, a half-bridge having first and second switches and a midpoint node, and a controller;
determining, by the controller, a zero-voltage-switching dead band in which the first and second switches are open, wherein determining the zero-voltage-switching dead band includes:
calculating a zero-voltage-switching charge requirement ($Q_{ZVS}$) for moving a voltage at the midpoint node from 0V to the DC rail voltage,
calculating, using a mathematical model, an average current ($I(T_{zvs})$) at the midpoint node over a maximum dead band, the maximum dead band being the maximum time period allowed to achieve zero-voltage switching during deactivation of the first switch and deactivation of the second switch, and
determining an ideal dead band ($T_{ZVS}$) for zero-voltage-switching based on a quotient of the zero-voltage-switching charge requirement ($Q_{ZVS}$) and the calculated average current ($I(T_{ZVS})$) at the midpoint node;
providing, by the controller, switching control signals to the first and second switches for generating an AC output, wherein a time interval between deactivation of the first switch and activation of the second switch is at least equal to the ideal dead band but not greater than the maximum dead band.

2. The method of claim 1 wherein determining the ideal dead band is in response to a detected change in an input current to the midpoint node of the half-bridge.

3. The method of claim 1 wherein determining the ideal dead band is in response to a detected change in the DC rail voltage.

4. The method of claim 1 wherein calculating the zero-voltage-switching charge requirement ($Q_{ZVS}$) is based on an equivalent capacitance at the midpoint node in which an input current is kept constant or a voltage across the half-bridge is kept constant.

5. The method of claim 4 wherein the equivalent capacitance includes a parasitic capacitance, a winding capacitance, and a switch capacitance.

6. The method of claim 1 further including storing the ideal dead band to a non-transitory computer readable memory.

7. The method of claim 1 wherein the half bridge is one of a plurality of half bridges of the switch mode power converter, the method further including determining, by the controller, the ideal dead band for each of the plurality of half bridges.

8. The method of claim 1 wherein the time interval is equal to the ideal dead band and a buffer period, the buffer period being between 1% and 10% of the dead band.

9. A switch mode power converter comprising:
a direct-current voltage source for providing a DC rail voltage;
a half-bridge connected in parallel with the direct current voltage source, the half-bridge including first and second switches and a midpoint node; and a controller operable to provide switching control signals to the first and second switches and operable to adjust a time interval between deactivation of the first switch and activation of the second switch, wherein controller determines the time interval by:

calculating a zero-voltage-switching charge requirement ($Q_{ZVS}$) for moving a voltage at the midpoint node from 0V to the DC rail voltage, calculating, using a mathematical model, an average current ($I(T_{ZVS})$) at the midpoint node over a maximum dead band, the maximum dead band being the maximum time period allowed to achieve zero-voltage switching during deactivation of the first switch and deactivation of the second switch, and determining an ideal dead band ($T_{ZVS}$) for zero-voltage-switching based on quotient of the zero-voltage-switching charge requirement ($Q_{ZVS}$) and the calculated average current ($I(T_{ZVS})$) at the midpoint node.

10. The switch mode power converter of claim 9 wherein the controller determines the time interval in response to a detected change in an input current to the midpoint node of the half-bridge.

11. The switch mode power converter of claim 9 wherein the controller determines the time interval in response to a detected change in the DC rail voltage.

12. The switch mode power converter of claim 9 wherein calculating a zero-voltage-switching charge requirement ($Q_{ZVS}$) is based on an equivalent capacitance at the midpoint node in which an input current is kept constant or a voltage across the half-bridge is kept constant.

13. The switch mode power converter of claim 9 further including a second half-bridge including a third switch and a fourth switch, the controller being operable to adjust a time interval between deactivation of the third switch and activation of the fourth switch.

14. The switch mode power converter of claim 9 wherein the half bridge forms part of a full bridge DC to AC inverter.

* * * * *